United States Patent
Pergande et al.

(10) Patent No.: US 11,635,606 B2
(45) Date of Patent: Apr. 25, 2023

(54) OPTICAL LENS FOR USE IN A MEDIA SUPPLY DEVICE AND LENS, MEDIA SUPPLY DEVICE AND MICROSCOPE

(71) Applicant: Carl Zeiss Microscopy GmbH, Jena (DE)

(72) Inventors: Saskia Pergande, Jena (DE); Peter Schacht, Erfurt (DE); Andreas Möbius, Jena (DE); Jörg Siebenmorgen, Jena (DE); Thomas Kalkbrenner, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 133 days.

(21) Appl. No.: 16/651,128

(22) PCT Filed: Sep. 28, 2018

(86) PCT No.: PCT/EP2018/076440
§ 371 (c)(1),
(2) Date: Mar. 26, 2020

(87) PCT Pub. No.: WO2019/063782
PCT Pub. Date: Apr. 4, 2019

(65) Prior Publication Data
US 2020/0271912 A1 Aug. 27, 2020

(30) Foreign Application Priority Data
Sep. 29, 2017 (DE) ..................... 10 2017 217 389.0

(51) Int. Cl.
*G02B 21/00* (2006.01)
*G02B 21/02* (2006.01)
(Continued)

(52) U.S. Cl.
CPC .......... *G02B 21/025* (2013.01); *G02B 21/33* (2013.01); *G02B 21/361* (2013.01)

(58) Field of Classification Search
CPC .. G02B 21/0088; G02B 21/02; G02B 21/025; G02B 21/33; G02B 21/361; G03B 27/42;
(Continued)

(56) References Cited

U.S. PATENT DOCUMENTS

| 3,837,731 A | 9/1974 | Amos et al. |
| 7,128,427 B2 | 10/2006 | Van Peski et al. |

(Continued)

FOREIGN PATENT DOCUMENTS

| CN | 101414101 A | 4/2009 |
| CN | 101592778 A | 12/2009 |

(Continued)

OTHER PUBLICATIONS

Translation of Chinese Office Action for Chinese Patent Application No. 2018800637459 dated Sep. 3, 2021.
(Continued)

*Primary Examiner* — Thong Q Nguyen
(74) *Attorney, Agent, or Firm* — Duane Morris LLP; Arthur M. Dresner

(57) ABSTRACT

An optical lens for use in a media feed device, having a first lens surface and a second lens surface, wherein the first lens is provided to be facing an object to be observed and the second lens surface is provided to be facing away from the object to be observed. At least one channel opening onto the first lens surface is present, wherein the at least one channel runs through the optical lens and at least one section of a media line is formed in the at least one, channel or, if a plurality of channels are formed, at least one of the plurality of channels opens up outside a highest point in alignment (Continued)

with a line that is vertical with respect to the first lens surface and to the surface of the earth.

7 Claims, 6 Drawing Sheets

(51) Int. Cl.
*G02B 21/33* (2006.01)
*G02B 21/36* (2006.01)

(58) Field of Classification Search
CPC ........ G03B 27/52; G03B 27/58; G03B 27/68; G03F 7/0341; G03F 7/2041; G03F 7/70058
USPC ............. 355/30–75; 359/368–398, 642, 656, 359/665–667
See application file for complete search history.

(56) References Cited

U.S. PATENT DOCUMENTS

| | | | |
|---|---|---|---|
| 7,324,185 B2* | 1/2008 | Mulkens | G03F 7/70358 355/53 |
| 9,939,625 B2 | 4/2018 | Herrmann et al. | |
| 10,649,194 B2* | 5/2020 | Kalkbrenner | G06T 7/0014 |
| 2005/0259234 A1 | 11/2005 | Hirukawa et al. | |
| 2006/0098297 A1 | 5/2006 | Van Peski et al. | |
| 2006/0197927 A1 | 9/2006 | Mulkens et al. | |
| 2020/0096752 A1* | 3/2020 | Kalkbrenner | G02F 1/1313 |

FOREIGN PATENT DOCUMENTS

| | | |
|---|---|---|
| CN | 101726986 A | 6/2010 |
| CN | 102540408 A | 7/2012 |
| CN | 102540443 A | 7/2012 |
| CN | 102566031 A | 7/2012 |
| CN | 103091825 A | 5/2013 |
| CN | 103592751 A | 2/2014 |
| CN | 105378537 A | 3/2016 |
| DE | 10123027 A1 | 11/2002 |
| DE | 10 2005 024 163 A1 | 1/2006 |
| DE | 102006010236 A1 | 9/2007 |
| DE | 10 2012 110 077 A1 * | 6/2014 |
| DE | 10 2015 200 927 A1 | 7/2016 |
| DE | 202016008115 U1 | 4/2017 |
| EP | 0 494 768 A2 | 7/1992 |
| WO | 02093232 A2 | 11/2002 |
| WO | 2006125538 A1 | 11/2006 |
| WO | 2007116647 A1 | 10/2007 |
| WO | 2008028475 A2 | 3/2008 |
| WO | 2009041268 A1 | 4/2009 |

OTHER PUBLICATIONS

Notification of Reasons for Rejection dated Sep. 6, 2022 in corresponding JP Application No. 2020-517873.

* cited by examiner

OPTICAL LENS FOR USE IN A MEDIA SUPPLY DEVICE AND LENS, MEDIA SUPPLY DEVICE AND MICROSCOPE

RELATED APPLICATIONS

The present application is a U.S. National Stage application of International PCT Application No. PCT/EP2018/076440 filed on Sep. 28, 2018, which claims priority benefit of German Application No. DE 10 2017 217 389.0 filed on Sep. 29, 2017, the contents of each are incorporated by reference in their entirety.

FIELD OF THE INVENTION

The invention relates to an optical lens according to the preamble of claim 1. Furthermore, the invention relates to an objective having such an optical lens, a media feed device, a microscope and a use of an optical lens.

BACKGROUND OF THE INVENTION

To increase the resolution or the contrast of microscopic images, it is often necessary to increase the numerical aperture and/or to minimize the number of refractive index transitions. This can be achieved by using appropriately selected immersion media.

Here, a region between the sample or cover glass and the objective or a lens upstream of the objective, hereinafter also referred to as the contact region, is filled with a contact medium (for example an immersion medium) such as water, immersion oil, glycerol, alcohol, with other customary immersion media or mixtures of these substances. The working distance is often only very short, especially with higher magnifying objectives, and is also difficult to access, particularly in the case of inverted microscopes. A manual immersion, i.e., a manual introduction of the immersion medium into the contact region, is very complicated. For longer lasting microscopy processes and the use of water as an immersion medium, there is also the fact that, due to evaporation of the water, the microscopy process could be interrupted if the immersion medium is not replenished. If oil is used as the immersion medium, the immersion medium is lost if, for example, the sample is repositioned and immersion medium is smeared on the cover glass (so-called "snail track effect"). An automatic immersion during the microscopy process is therefore advantageous.

Various technical solutions are known for supplying a front lens, for example of an objective, manually or automatically with an immersion medium, some of which are listed hereinafter by way of example.

An immersion objective for microscopic examination of an object is known from WO 08/028475 A2, which has a feed apparatus for feeding immersion medium, in particular an immersion liquid, into the region (contact region) between the object or an object carrier and the outer lens of the objective. The feed apparatus comprises a cap which surrounds the objective body and is open in the region of the outer lens and which forms a gap toward the outer lens. A space for receiving immersion liquid is formed within the cap. The immersion liquid is output through the gap. The feed apparatus has at least one connection formed in the cap for the constant supply of immersion liquid.

A device for distributing immersion oil between a front lens of an objective and an object carrier such as a cover glass is described in U.S. Pat. No. 3,837,731 A. The objective is surrounded by a container and protrudes through an opening in a side wall of the container. An immersion oil is provided and flows between the front lens and the object carrier.

WO 2002/093232 A2 specifies a device for examining chemical and/or biological samples. The device has a sample carrier for receiving samples and an objective for observing the sample through a sample carrier wall. A gap is formed between an outer surface of the sample carrier wall and an output lens of the objective. An automatic feed apparatus for automatically feeding an immersion medium is provided between the outer surface of the sample carrier wall and the output lens of the objective.

A device and a method for forming a film of immersion means between a sample carrier and an objective of a microscope are known from DE 10 2015 200 927 A1. The invention relates to an auto immersion module for feeding the immersion means from an immersion means reservoir to a point of impact on the sample carrier. It consists of a spray apparatus furnished with a nozzle, which is connected to a pump for generating a jet of immersion means. Here, a metered jet of immersion means is sprayed via the auto immersion module onto a point of impact between the sample carrier and objective at a defined speed.

However, the specified solutions require a correspondingly large installation space in the vicinity of the objective. Furthermore, positioning of the lens is required, for the mechanism of which installation space is also required.

Further technical solutions are known from U.S. Pat. No. 7,128,427 B2 and from WO 2007/116647 A1.

U.S. Pat. No. 7,128,427 B2 describes a method and a device for immersion lithography. The device comprises a lens element which has a perforation in its center. Gas contained in an immersion medium can rise and be discharged through the perforation so that the lithography process is not disturbed by gas bubbles collecting under the lens element.

A similar solution is described in WO 2007/116647 A1. An optical lens in contact with an immersion medium has flattened side regions or flanks in which at least one perforation is located. The perforation serves the discharging of unwanted gas bubbles.

The invention is based on the object of proposing a possibility by means of which an immersion medium can be reliably brought into a contact region and at the same time little installation space is required.

DESCRIPTION OF THE INVENTION

The object is achieved by means of an optical lens as set forth in the annexed claims and by means of an immersion device also as set forth in the annexed claims and a microscope as claimed. A microscope having an optical lens and use of an optical lens are covered in the annexed claims. Advantageous developments are the subject matter of the dependent claims.

The optical lens is provided and formed for use in a media feed device. It has a first lens surface and a second lens surface, wherein the first lens surface is provided to be facing an object to be observed and the second lens surface is provided to be facing away from the object to be observed.

According to the invention, at least one channel opening onto the first lens surface is formed, wherein the channel runs through the optical lens. At least one section of a media line for guiding a medium is formed in the channel. The channel opens up outside a highest point in vertical alignment of the first lens surface. If a plurality of channels are formed, at least one of the present channels opens up outside a highest point in vertical alignment of the first lens surface.

The optical lens is vertically aligned when the optical axis of the lens is aligned vertically to the earth's surface and the gravitational force acts along the optical axis.

The arrangement of the mouth of the channel outside the highest point of the first lens surface promotes mixing and exchange of the medium when the latter is located on the first lens surface. For example, a contact region or a contact volume for receiving an amount of the medium is present on the first lens surface.

If a plurality of channels are formed, one of the channels can be formed to open onto the highest point of the first lens surface. In this case, feeding and discharging a medium through the optical lens via separate channels is possible, for example. If the medium intermittently or continuously flows through the channel which opens onto the highest point in the case when the optical lens is used in a media feed device and if the channel which opens onto the highest point is formed in particular as a media outlet, possibly collecting gases are discharged from the contact region.

By means of the embodiments according to the invention, components of one or more media lines are advantageously arranged or are arrangeable in the direct vicinity of the optical lens, which is, for example, a front lens, in such a way that the installation space requirement is significantly reduced.

Within the meaning of this description, media are understood to mean in particular immersion media, rinsing media and additional media. Media can also be nutrient media, gases and gas mixtures or aerosols. Rinsing media serve to remove residues of a medium, for example an immersion medium, from the media line(s) and channel(s) and from the contact region. Additional media serve, for example, to change the optical, hydraulic and/or physical properties of media by mixing them with a medium, for example dissolving or dispersing them.

Media used in low doses as an additional medium, for example high-percentage or absolute alcohol, can act and be used in high doses as a rinsing medium.

The media are kept available in appropriate reservoirs, for example. These can be furnished with pumps, by means of which the medium in question is pushed or sucked through the media line(s) connected to the reservoir. Additionally, there can be at least one reservoir for used media present.

In one possible embodiment of the optical lens, the wall of the channel forms the section of the media line.

Furthermore, the optical lens can have an optical used region that no channel runs through. By means of such an embodiment, the channel or the channels do not impair the beam path of radiation penetrating the optical lens and so the usability of the optical lens is not additionally restricted.

In a further embodiment, the media line having the section is accommodated in the channel. Over part of its length, the media line is, for example, inserted, plugged, adhesively bonded or pressed into the channel. The media line consists, for example, of metal, plastic, a rubber mixture, glass or a composite material and is connected to the channel.

The media line can be, for example, a hose, a tube or a hollow profile. At least over the section of the media line accommodated in the channel, this can also be a porous and/or absorbent material such as a textile thread, an open-cell foam or sponge or a porous ceramic.

In further embodiments, the media line can also be mounted on a mount of the optical lens or integrated into it.

If the optical lens is a constituent part of an objective, at least one media line can be integrated into a housing of the objective or mounted on it.

The optical lens can be formed as a meniscus lens or as a virtual relay. One or more objectives or other optical elements can be assigned to an optical lens formed in such a way, and so one or more beam paths of the assigned objectives or optical elements run through the optical lens.

A virtual relay is understood to mean a lens that generates a magnified virtual image of the sample on the sample side. With a microscope objective, e.g. a detection objective, this image is imaged onto a camera or another detector. One or both sides of the lens advantageously have an aspherical shape, as a result of which the aberrations of an oblique passage, for example through the base of a sample carrier, can be compensated.

A meniscus lens is a lens which has two lens surfaces that are curved to the same side. Advantageously, both lens surfaces have the same center point. In relation to the virtual relay, the meniscus lens has the advantage that it is easier and more cost effective to produce.

A connector element is used to connect the media line to the channel and is for example formed as a tube formed, for example cast, on at the optical lens. The connector element can have an additional option for locking the media line, for example by means of a union nut, a clamping sleeve or similar. The section of the connector element, through which the medium flows or is able to flow, is considered to belong to the media line.

The optical lens can have differently shaped lens surfaces in different embodiments. In one embodiment of the optical lens, the first lens surface can have a concave embodiment. The second lens surface can have a concave, planar or convex embodiment.

A useful option for auto immersion is the embodiment of the front lens of an optical system as a concave or meniscus lens, wherein this lens does not necessarily have to be held in the actual objective, but can also be held separately. The optical lens according to the invention can be formed as such a front lens.

The cavity formed by the concave shaped first lens surface is filled with a medium, for example, an immersion medium or a rinsing medium, with the aid of the surface tension of said medium.

This cavity can be filled manually or in automated fashion with immersion liquid. For this purpose, it is useful to insert at least one channel for the immersion medium in regions of the lens that are not absolutely necessary for the optical imaging, that is to say outside a used region of the optical lens.

The lens can be made of glass or a plastic and can be cast, injection molded, turned, milled, pressed or printed, for example.

A channel can be drilled, milled, spark eroded, cut or introduced by means of laser radiation or ultrasound into the optical lens, for example. The channel can also already be formed during the manufacturing process of the optical lens, for example during casting, pressing or forming. Furthermore, it is possible to generate connections, for example hose connections (olives), of the media line(s) directly during primary forming of the optical lens, e.g. casting or pressing.

The channel can also be formed or introduced there in the surface of the optical lens, in particular in the first lens surface, and is then not surrounded on all sides by material of the optical lens. The section of the media line can be inserted in a channel formed in such a way. A medium can flow through or wet the partially open channel by way of the force of gravity and/or the surface tension between the material of the channel wall and the medium.

A further embodiment of the optical lens consists of introducing a second channel into regions of the lens that are not used for optical imaging. These channels, which are located outside the used region of the optical lens, are used for draining or suctioning away the respective medium, for example after a microscopy process.

In a further embodiment, a third bore, i.e., a third channel, is formed outside the used region. The third channel is used to feed the rinsing medium after using, for example, glycerol or immersion oil for microscopy, in order to remove these immersion media again.

In further embodiments, different media can also be fed in and/or out or be feedable in and/or out through the same channels.

The optical lens can be a complex optical element. For example, it can be formed as an arrangement of a plurality of individual lenses.

The respective medium can be transported in the media line by generating a pressure difference. Pressure differences can be generated, for example, by furnishing the media line and/or a reservoir with a pump, which is preferably controllable. Alternatively, a syringe can be connected to the media line.

Passive transport of the medium through the respective media line, as can be caused, for example, by capillary effects and/or by the effect of communicating tubes, allows, for example, simple refilling of the medium in the event of evaporation or loss due to adhesion (the above-mentioned effect of the "snail track"). In order to achieve this effect, the channel is or channels are preferably embodied with regard to their dimensions and, if appropriate, with regard to the material, in such a way that the desired capillary effect is achieved.

In order to avoid or at least limit an undesired and uncontrolled output of the medium into the contact region or from a leak in the media line, a safety device, for example a safety valve, can be provided in or on the media line in a further embodiment. In addition, a protective element in the form of a plate, a membrane or bellows can be present and arranged in such a way that no medium can flow past the optical lens or the objective having the optical lens. The protective element seals the contact region on one side.

The optical lens in one of its embodiments can be used in an objective, for example as a front lens.

A solution of the problem is also achieved by a media feed device which is formed for feeding a medium to a contact region between an optical lens and a sample and comprises the optical lens and at least one media line for guiding a medium between the contact region and a reservoir. The optical lens has a first lens surface and a second lens surface, wherein the first lens surface is provided to be facing an object to be observed, for example the sample—and thus the contact region. The second lens surface is provided to be facing away from the object to be observed.

According to the invention, the optical lens has at least one channel opening onto the contact region. The channel runs through the optical lens. The one channel or at least one of the present channels opens up outside a highest point in vertical alignment of the first lens surface.

The media line is accommodated in the channel over a section of the length of said media line, as already explained above for the optical lens.

The objective having the optical lens according to the invention and/or the immersion device can be a constituent part of a microscope, for example of a light sheet microscope.

The optical lens or an objective having an optical lens according to the invention can be used in a media feed device.

An optical lens used in this way has a first lens surface and a second lens surface and an optical axis, wherein the first lens surface is provided to be facing an object to be observed and the second lens surface is provided to be facing away from the object to be observed.

SUMMARY OF THE INVENTION

According to the invention, when used in a media feed device, the optical lens is arranged in a working position in which the optical axis in the working position is inclined with respect to a vertical. The deviation of the optical axis of the lens from the vertical is, for example, at least 15°. The optical lens has at least one channel opening onto the first lens surface, wherein the channel runs through the optical lens. At least one section of a media line is formed in the channel. The channel or at least one of the present channels opens up outside a highest point of the first lens surface which is in the working position.

The optical axis of the optical lens, which axis is inclined in the working position, possibly allows gases escaping from a medium to rise to an edge region of the optical lens, wherein the edge region advantageously does not lie in a used region of the optical lens. The edge region can be furnished with a discharge line, for example a vent, wherein the venting function can be performed by one of the channels of the optical lens.

The lens surfaces can, for example, be concave, planar or convex or aspherical.

The invention offers a number of advantages. Thus the front lens of a conventional objective can be modified and furnished with at least one channel. No new objectives need to be purchased. The installation space required is reduced compared to the solutions known from the prior art.

BRIEF DESCRIPTION OF THE DRAWINGS

The invention is explained in more detail below with the aid of illustrations and exemplary embodiments. In the figures.

DETAILED DESCRIPTION OF THE DRAWINGS

The exemplary embodiments shown in FIGS. 1 to 6 are schematic and are not to scale. The same reference signs denote the same elements.

Figure 1:
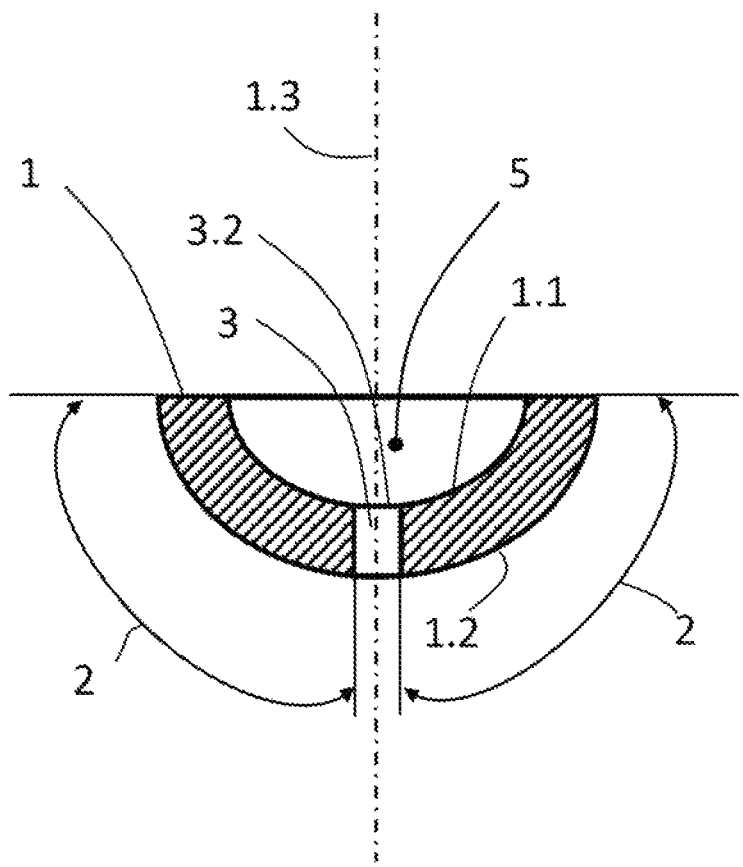
FIG. 1 shows a schematic representation of a first exemplary embodiment of an optical lens according to the invention in a sectional representation.

A first exemplary embodiment of an optical lens 1 according to the invention is shown in FIG. 1 as a section along a diameter of the rotationally symmetrical optical lens 1. The optical lens 1 has a first lens surface 1.1 and a second lens surface 1.2. An optical axis 1.3 of the optical lens 1 coincides with a vertical. The optical lens 1 shown in FIG. 1 is oriented perpendicularly. The first lens surface 1.1 has a concave shape and faces a contact region 5, which can be filled with a medium 7 (see FIG. 3). In the middle of the optical lens 1, i.e. at its vertex or zenith, a channel 3 is present, which runs through the material of the optical lens 1 and whose mouth 3.2 faces the contact region 5. The first lens surface 1.1 is provided to be facing an object 15 to be observed (see FIGS. 4, 5 and 6), while the second lens surface 1.2 is provided to be facing away from the object 15 to be observed.

Those regions of the optical lens 1 that the channel 3 does not run through represent an optical used region 2 of the optical lens 1. In the used region 2, rays passing through the optical lens 1, for example illumination radiation IB (see FIGS. 4 and 5) and/or detection radiation DB (see FIG. 4), are not influenced by the channel 3, in particular are not refracted, diffracted and/or dispersed thereby.

Figure 2:
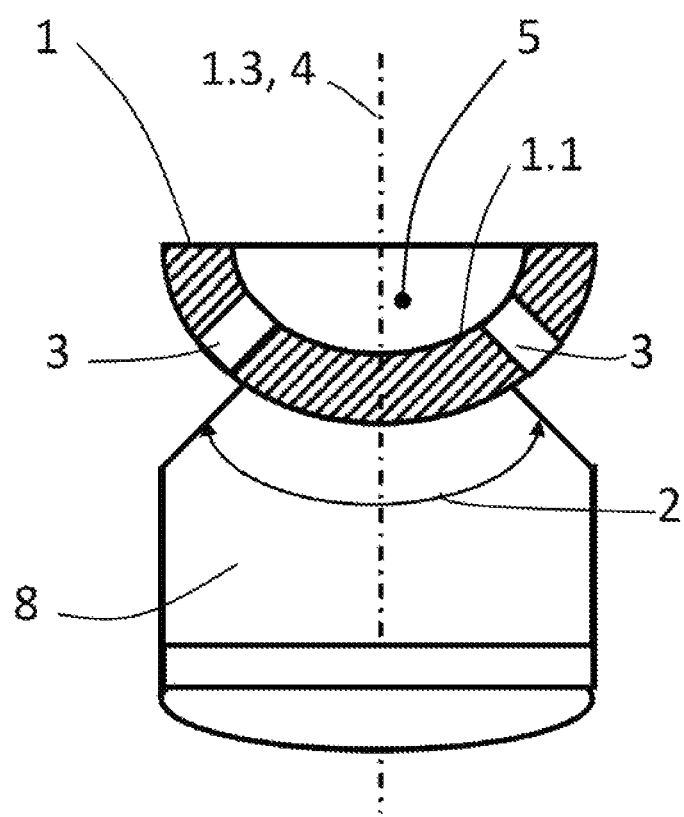
FIG. 2 shows a schematic representation of a second exemplary embodiment of an optical lens according to the invention in a sectional representation as a front lens of an objective.
Figure 4:
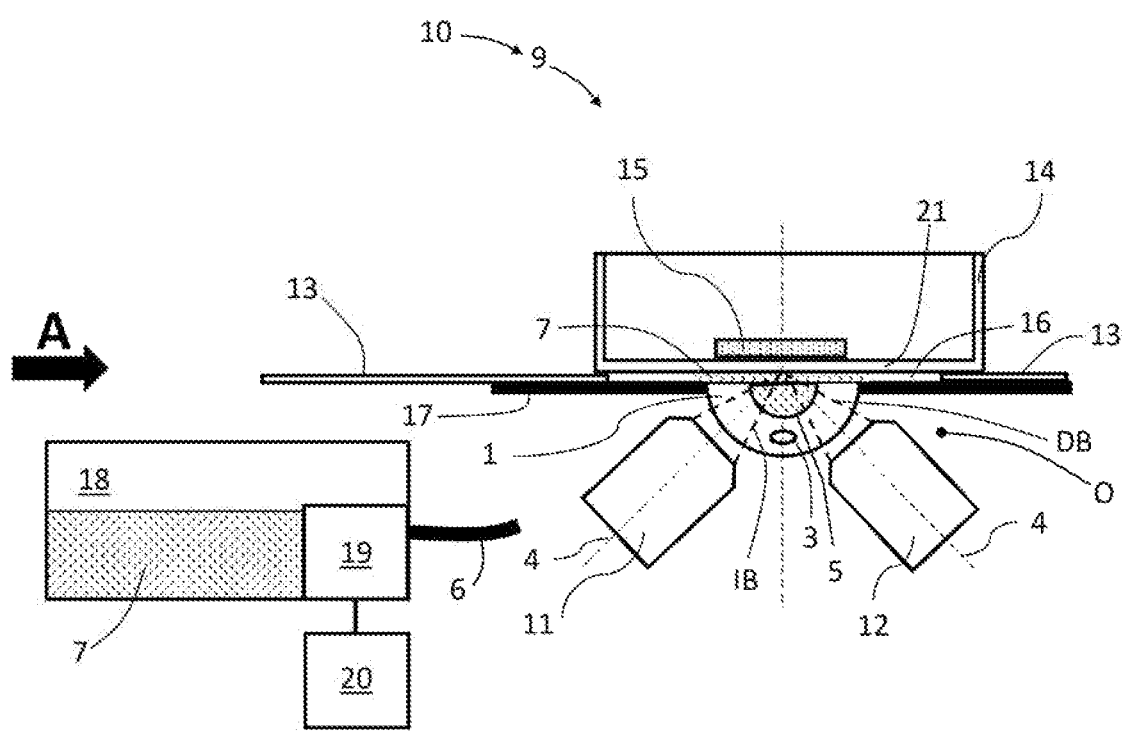
FIG. 4 shows a schematic representation of a first exemplary embodiment of an immersion device according to the invention in a first view.
Figure 5:
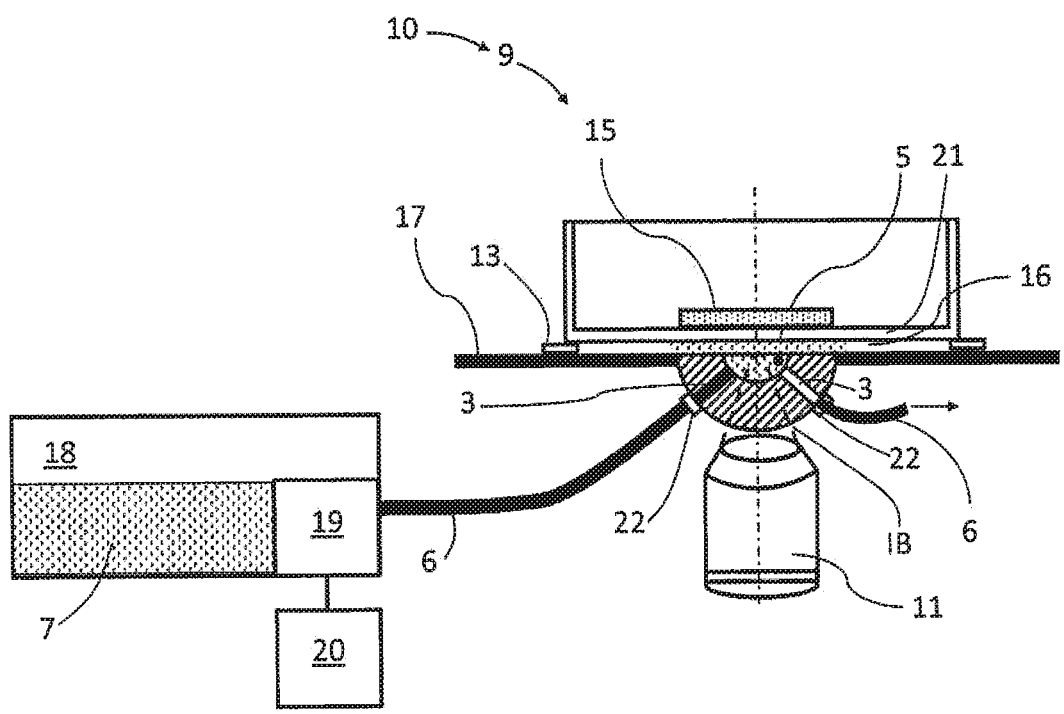
FIG. 5 shows a schematic representation of the exemplary embodiment of an immersion device according to the invention in a second view and FIG. 6 shows a schematic representation of an exemplary embodiment of a media feed device according to the invention with an optical lens arranged inclined with respect to the vertical.

The optical lens 1 according to the first exemplary embodiment can be assigned as an individual lens, for example as a meniscus lens or as a virtual relay, to one or more objectives 8 in such a way that their respective optical axes 4 are directed to the used region 2 (see FIGS. 2, 4 and 5).

An embodiment of the optical lens 1 as a front lens of an objective 8 is shown in FIG. 2. The optical lens 1 of the second exemplary embodiment has two channels 3 which are formed in the lateral regions of the optical lens 1. As a result, the used region 2 is located around the optical axis 4 of the objective 8 and occupies the central part of the optical lens 1.

Figure 3:
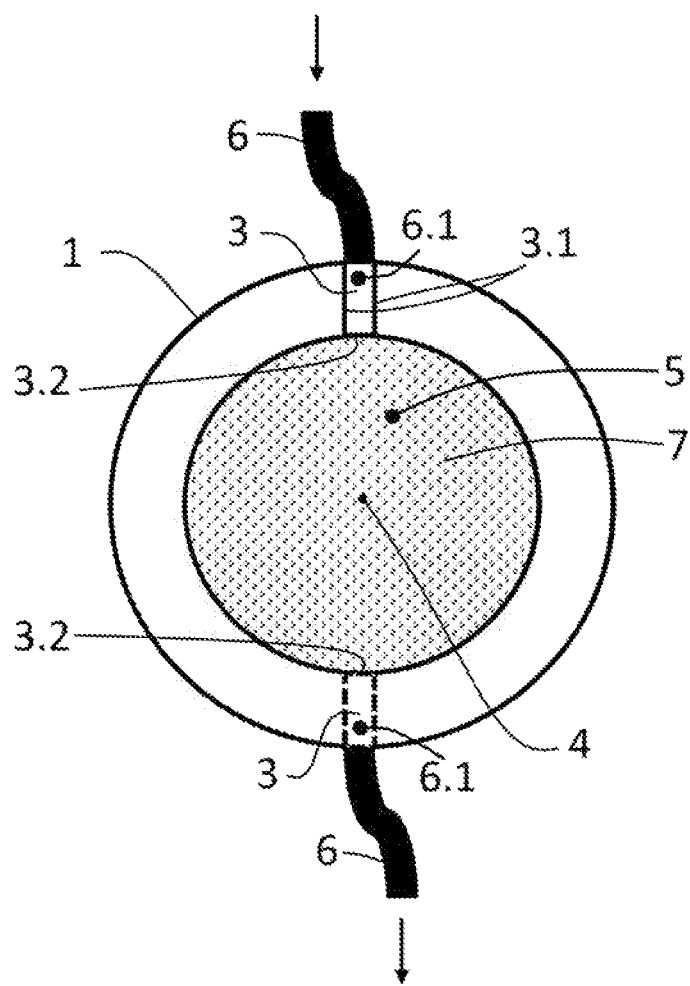
FIG. 3 shows a schematic representation of a third exemplary embodiment of an optical lens according to the invention in a view from above.

The channels 3 are formed so far to the side that feeding or discharging a medium 7 (see FIGS. 3 to 6) into or out of the contact region 5 can take place by means of a media line 6 not shown here (see FIGS. 3 to 5).

A third exemplary embodiment of an optical lens 1 according to the invention is shown in plan view in FIG. 3. The concave-shaped first lens surface 1.1 can be seen, which is filled with a medium 7 in its central depression as the contact region 5. The medium 7 is feedable to the contact region 5 via a channel 3, which is formed as a channel 3 which is open in a direction toward the observer. The medium 7 is dischargeable via a second channel 3, which is surrounded by the material of the optical lens 1 (symbolized by dashed lines). The channels 3 open onto the central depression and thus onto the contact region 5 (mouths 3.2).

A media line 6 is connected to each of the channels 3. The walls 3.1 of the channels 3 serve as sections 6.1 of the media lines 6.

An immersion device 9 according to the invention is shown in FIG. 4. The immersion device 9 is a constituent part of a microscope 10, not shown in more detail.

The optical lens 1 is formed in the form of a meniscus lens and assigned to a stage 13, advantageously to a controllably displaceable stage 13. The optical lens 1 is sealed by a protective element 17 in the form of a horizontally arranged membrane from an optics space O, in which objectives, an illumination objective 11 and a detection objective 12 in this example, are arranged and into which the optical lens 1 arches.

A Petri dish is present on the stage 13 as a sample carrier 14, a sample 15 being placed on the base of said sample carrier. This base is formed by a cover glass 21 that is defined in terms of its thickness and refractive index.

The illumination objective 11 and the detection objective 12, and hence the optical axes 4 thereof, are respectively inclined at an angle of, e.g., 45° in relation to a vertical axis that is shown as a reference axis (interrupted solid line) and directed to a common point of the sample 15. Here, the two objective axes 4 are orthogonal to one another. The optical lens 1 is located in the beam paths of the illumination objective 11 and the detection objective 12, which is shown by the schematic illustration of illumination radiation IB (illumination beam) and detection radiation DB (detection beam) using interrupted solid lines.

The optical lens 1 has two channels 3, of which the mouth 3.2 of one of the channels 3, provided for the connection of a media line 6, can be seen in FIG. 4.

The media line 6 is connected to a reservoir 18, in which medium 7 is contained and is feedable to the contact region 5 through the media line 6 by means of a pump 19. The pump 19 is connected to a control unit 20 and actuatable thereby.

A gap 16 is present between the optical lens 1 and the lower side of the sample carrier 14. This is filled with a medium 7, for example with an immersion medium, due to arising capillary forces when the contact region 5 is filled with the medium 7. The contact region 5 that is filled with the medium 7, the region of the gap 16 below the sample 15 also being counted as such, forms an optical connection with few or no refractive index differences between the optical lens 1 and the material of the base of the sample carrier 14.

In an alternative embodiment, the optical lens 1 embodied as a meniscus lens has a channel 3 which runs through the zenith of the optical lens 1 from the first lens surface 1.1 to the second lens surface 1.2. The channel 3 can be used for discharging the medium 7. Thus, the medium 7 can be guided into the contact region 5 via the protective element 17, for example run into said contact region. If necessary, the medium 7 is sucked through the channel 3.

The immersion device 9 is shown in a second view in FIG. 5, wherein the direction of view corresponds to the direction of the arrow A from FIG. 4. The reservoir 18, the pump 19 with media line 6 and the control unit 20 are represented from the same perspective as in FIG. 4.

In addition to FIG. 4, FIG. 5 shows media lines 6 that are connected to the optical lens 1 (illustrated in a section). The media lines 6 are connected to the optical lens 1 by means of a respective connector element 22, for example a nozzle with a union nut.

The media line 6 coming from the reservoir 18 is additionally plugged into the channel 3 up to its mouth 3.2. The other media line 6, which serves to discharge the medium 7 from the contact region 5, is only connected to the connector element 22 and held at the optical lens 1. The wall 3.1 of the channel 3 functions as the wall of the media line 6 via the section 6.1 (see FIG. 3).

In order to operate the immersion device 9, a medium 7, in particular an immersion medium, is filled into the reservoir 18. The medium 7 is selected, for example, on the basis of the properties of the materials of the optical lens 1, the cover glass 21 and/or the sample 15 and the illumination radiation IB used. As a result of a control command of the control unit 20, the medium 7 is conveyed by the pump 19 through the media line 6 into the contact region 5 until the latter is filled and bubble-free wetting of the first lens surface 1.1 via the used region 2 and of the object carrier 14 at least below the sample 15 via a region to be observed has occurred.

Subsequently, the sample 15 can be observed and imaged by virtue of the selected illumination radiation IB being radiated into the sample 15 through the used region 2 of the optical lens 1 and through the medium 7 located in the contact region 5 and the base of the object carrier 14, by means of the illumination objective 11. Detection radiation DB coming from the sample 15 in the form of reflected portions of the illumination radiation IB and/or radiations excited by the illumination radiation IB, such as fluorescence radiation, are captured by means of the detection objective 12 and supplied to a detector (not shown).

After the end of the sample examination, the immersion medium can be replaced by a new immersion medium or by a rinsing medium. The consumed medium 7, in this case the immersion medium, leaves the contact region 5 through the second channel 3 and it is guided into a collection or waste reservoir (not shown), for example.

In further embodiments of the immersion device 9, the pump 19 is actuated by means of the control unit 20 in such a way that the medium 7 in the contact region 5 is replaced at intervals or continuously.

Figure 6:
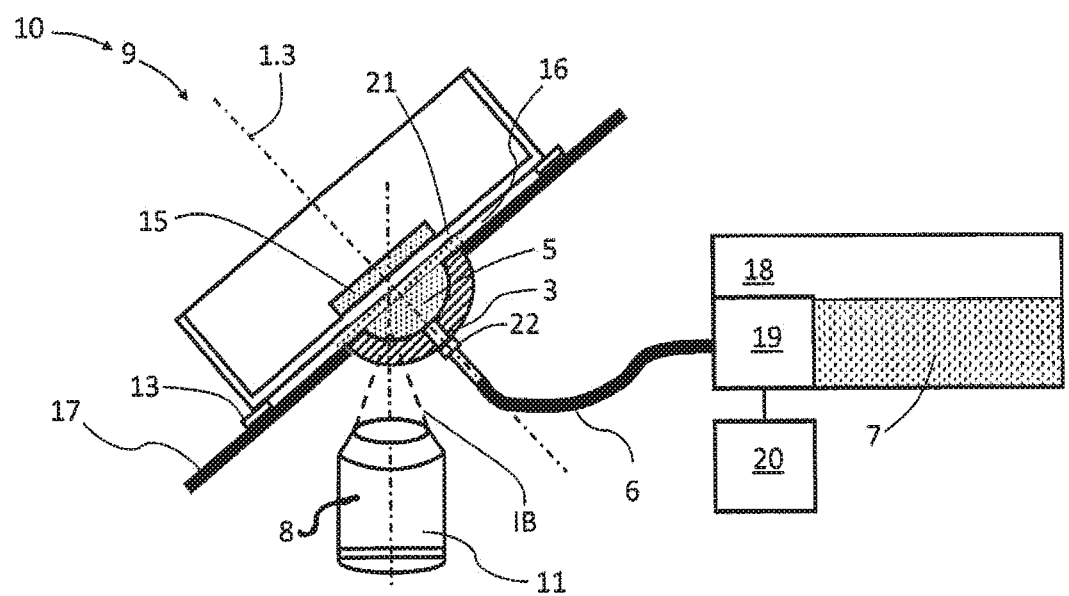

A use of an optical lens 1 with a channel 3 according to the invention is shown in an example in FIG. 6. The optical axis 4 of the objective 8 coincides with the vertical. The optical axis 1.3 of the optical lens 1 is inclined by approximately 45° with respect to the vertical and is in a working position.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS 1 optical lens
1.1 first lens surface
1.2 second lens surface
1.3 optical axis (of the optical lens 1)
2 (optical) used region
3 channel
3.1 wall (of the channel)
3.2 mouth (of the channel)
4 optical axis (of the objective)
5 contact region
6 media line
6.1 section (of the media line)
7 medium
8 objective
9 immersion device
10 microscope
11 illumination objective
12 detection objective
IB illumination radiation
DB detection radiation
O optics space
13 stage
14 sample carrier
15 sample
16 gap
17 protective element
18 reservoir
19 pump
20 control unit
21 cover glass
22 connector element

What is claimed is:

1. A microscope having an optical lens, said optical lens comprising:
a first lens surface and a second lens surface, wherein the first lens surface is arranged to be facing an object to be observed and the second lens surface is arranged to be facing away from the object to be observed; with respect to a line that is oriented vertical with respect to the surface of the earth when the earth's gravitational force acts along an optical axis,
at least one channel opening onto the first lens surface, wherein the at least one channel runs through said optical lens,
one section of a media line formed in each of the at least one channel,
the at least one channel or, if a plurality of channels are formed, at least one of the plurality of channels opens up outside a highest point in vertical alignment of the first lens surface,
an immersion device;
a controllable and displaceable stage for holding a sample carrier with a sample placed on a base of the sample carrier;
an illumination objective and a detection objective, whereas respective objective axes of said illumination objective and said detection objective are orthogonal to one another and are directed to a common point of the sample;
said illumination objective and said detection objective being both placed below the stage;
said optical lens located in beam paths of said illumination objective and said detection objective as a common optical lens;
wherein said common optical lens is formed as a meniscus lens assigned to the stage and sealed by a protective element in a form of a horizontally arranged membrane from an optics space, where said illumination objective and said detection objective are arranged and into which said optical lens arches;
at least a first channel opening onto the first lens surface; wherein the at least first channel runs through said optical lens; and
a section of a media line being formed in the first channel.

2. The microscope having an optical lens as claimed in claim 1, further comprising a used region of said optical lens is present in which no channel runs through.

3. The microscope having an optical lens as claimed in claim 1, wherein a wall of a first channel forms the one section of the media line.

4. The microscope having an optical lens as claimed in claim 1, wherein the media line has the one section accommodated in a first channel.

5. The microscope having an optical lens as claimed in claim 1, wherein the first lens surface has a concave embodiment.

6. The microscope having an optical lens as claimed in claim 1, wherein the second lens surface has a concave, planar or convex or aspherical embodiment.

7. The microscope having an optical lens as claimed in claim 1, wherein said optical lens is formed as an arrangement of a plurality of individual lenses.

* * * * *